United States Patent [19]

Maruyamano et al.

[11] Patent Number: 4,776,443
[45] Date of Patent: Oct. 11, 1988

[54] FRICTION DISC CLUTCH ASSEMBLY

[75] Inventors: Satoru Maruyamano; Hisao Ootani, both of Toyota, Japan

[73] Assignee: Toyota Jidosha Kabushiki Kaisha, Japan

[21] Appl. No.: 890,367

[22] Filed: Jul. 29, 1986

[30] Foreign Application Priority Data

Aug. 2, 1985 [JP] Japan ............................ 60-119577[U]

[51] Int. Cl.$^4$ ............................................. F16D 13/72
[52] U.S. Cl. ............................ 192/70.12; 192/113 A
[58] Field of Search ........................ 192/70.12, 113 A

[56] References Cited

U.S. PATENT DOCUMENTS

| | | | |
|---|---|---|---|
| 1,979,880 | 11/1934 | Heinrich | 192/70.12 X |
| 2,144,298 | 1/1939 | Padgett | 192/70.12 |
| 2,270,467 | 1/1942 | Nutt | 192/70.12 |
| 2,277,557 | 3/1942 | Nutt | 192/70.12 |
| 2,581,637 | 1/1952 | Danly et al. | 192/113 A |
| 2,770,341 | 11/1956 | Wobrock | 192/70.12 |
| 3,533,494 | 10/1970 | Spokas et al. | 192/99 |
| 3,670,859 | 6/1972 | Schiefer et al. | 192/112 |
| 3,809,192 | 5/1974 | Stehle | 192/113 A X |
| 4,382,497 | 5/1983 | Sakai et al. | 192/70.12 X |

FOREIGN PATENT DOCUMENTS

| | | | |
|---|---|---|---|
| 882855 | 7/1943 | France. | |
| 1066876 | 10/1959 | Fed. Rep. of Germany | 192/113 A |
| 2922165 | 12/1980 | Fed. Rep. of Germany. | |
| 0666327 | 6/1979 | U.S.S.R. | 192/113 A |
| 0898176 | 1/1982 | U.S.S.R. | 192/113 A |
| 853356 | 11/1960 | United Kingdom. | |
| 1250355 | 10/1971 | United Kingdom. | |
| 2142100A | 1/1985 | United Kingdom. | |
| 2150652 | 7/1985 | United Kingdom. | |

Primary Examiner—Rodney H. Bonck
Attorney, Agent, or Firm—Parkhurst, Oliff & Berridge

[57] ABSTRACT

In a friction disc clutch assembly of the type including a flywheel secured to a drive shaft, a clutch cover having an outer peripheral rim secured to the flywheel by means of a plurality of circumferentially spaced bolts and being formed with an internal cylindrical surface, a pressure plate mounted within the clutch cover in such a manner as to be rotatable with and axially displaceable with respect to the flywheel, a diaphragm spring assembled within the clutch cover to bias splined to a driven shaft and interposed between the flywheel and the pressure plate, the outer periheral rim of the clutch cover is formed with a radial exhaust hole located between each pair of the circumferentially spaced bolts and extending outwardly from the internal cylindrical surface of the clutch cover to exhaust muddy water entered into the interior of the clutch cover.

4 Claims, 5 Drawing Sheets

FRICTION DISC CLUTCH ASSEMBLY

BACKGROUND OF THE INVENTION

1. Field of the Invention

The present invention relates to a friction disc clutch assembly adapted for use in automotive vehicles, and more particularly to an improvement of a clutch cover in the friction disc clutch assembly.

2. Description of the Prior Art

As shown in FIG. 10, a conventional friction disc clutch assembly comprises a flywheel 2 secured to a drive shaft 1, a clutch cover 4 integrally connected to the annular flange of flywheel 2 by means of a plurality of circumferentially spaced bolts 3, a pressure plate 5 mounted in the clutch cover 4 in such a manner as to be rotatable with and axially displaceable with respect to the flywheel 2, a diaphragm spring 6 mounted within the clutch cover 4 to bias the pressure plate 5 toward the flywheel 2, and a clutch disc 8 splined to a driven shaft 7 and interposed between the flywheel 2 and the pressure plate 5. The clutch disc 8 is integrally provided with a pair of clutch facings 9 for frictional engagement with the flywheel 2 and pressure plate 5. When pressed between the flywheel 2 and the pressure plate 5 under the biasing force of diaphargm spring 6, the clutch disc 8 acts to transmit rotational torque of the drive shaft 1 to the driven shaft 7 therethrough. When the biasing force of diaphragm spring 6 is released to retract the pressure plate 5, the clutch disc 8 is disengaged from the flywheel 2 to disconnect the torque transmission between the drive shaft 1 and the driven shaft 7. As shown in FIG. 9, the clutch cover 4 is formed approximately in an annular configuration and formed in its outer peripheral portion with an internal cylindrical surface $4a$ the radius $r_o$ of which is determined with center at the rotation axis X of the clutch assembly.

In general, the friction disc clutch assembly is contained within a housing which is formed with a vent hole for cooling the clutch assembly. During travel of the vehicle on muddy roads, the vent hole permits entrance of muddy water into the housing. The muddy water flows into the interior of clutch cover 4 through the central opening $6a$ of diaphragm spring 6 and is splashed radially outwardly due to a centrifugal force acting thereon. As a result, the muddy water is splashed onto the internal cylindrical surface $4a$ of clutch cover 4 and deposited there as illustrated by cross-hatching M in the figure. The deposit of muddy water causes trouble in axial displacement of the pressure plate 5, resulting in insufficient disengagement of the clutch assembly. If the deposited mud falls between the pressure plate 5 and the facings 9 of clutch disc 8, there will occur slippage of the clutch assembly and unexpected defacement of the clutch facings 9 in a short period of time.

SUMMARY OF THE INVENTION

It is, therefore, a primary object of the present invention to provide an improved friction disc clutch assembly capable of exhausting the muddy water entered into the interior of the clutch cover in a simple construction to eliminate trouble caused by the deposit of mud in the clutch cover.

According to the present invention, the primary object is accomplished by providing a friction disc clutch assembly wherein the clutch cover is formed at the outer peripheral portion with a radial exhaust hole located between each pair of the circumferentially spaced bolts and extending outwardly from the internal cylindrical surface of the clutch cover. Preferably, the internal cylindrical surface of the clutch cover is formed to include a pair of guide surfaces inclined radially outwardly toward the radial exhaust hole.

BRIEF DESCRIPTION OF THE DRAWINGS

Other objects, features and advantages of the present invention will become apparent from the following detailed description of preferred embodiments and certain modifications thereof when taken together with the accompanying drawings, in which like reference numerals designate the same or similar parts throughout the figures thereof and in which.

DETAIELD DESCRIPTION OF THE PREFERRED EMBODIMENTS

Figure 1:
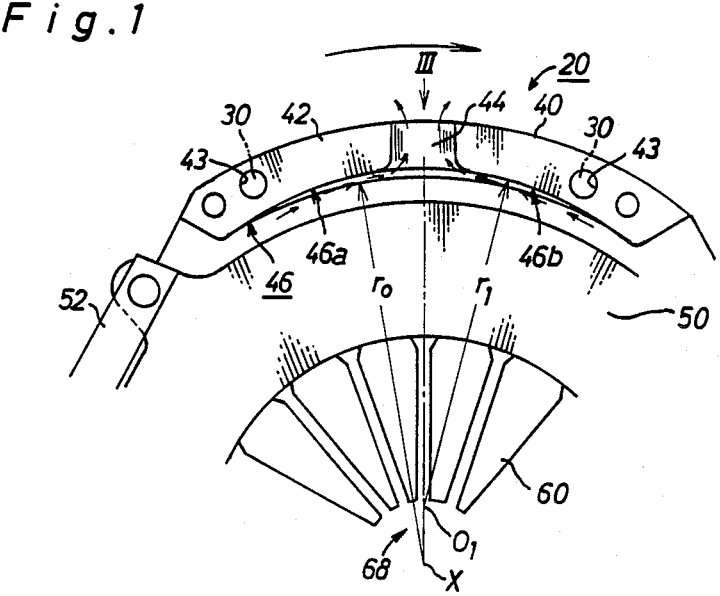
FIG. 1 is a fragmentary front view taken along line I—I in FIG. 2, showing an outer peripheral portion of a clutch cover.

Referring now to the drawings, particularly in FIGS. 1 through 6, there is illustrated a friction disc clutch assembly 20 which includes a flywheel 12 secured to a drive shaft 10 in the form of a crankshaft of a prime mover by means of a plurality of circumferentially spaced bolts 16. The flywheel 12 is formed at one side thereof with an annular friction surface 14 and provided at the outer periphery thereof with a ring gear 18 for starting the prime engine. The clutch assembly 20 further includes a clutch cover 40 secured at its outer peripheral rim 42 to the flywheel 12 by means of a plurality of circumferentially spaced bolts 30, a pressure plate 50 mounted in the clutch cover 40 in such a manner as to be rotatable with and axially displaceable with respect to the flywheel 12, a diaphragm spring 60 mounted within the clutch cover 40 to bias the pressure plate 50 toward the flywheel 12, and a clutch disc 80 splined to a driven shaft 70 in the form of an input shaft of a power transmission (not shown) and interposed between the flywheel 12 and the pressure plate 50.

Figure 4:
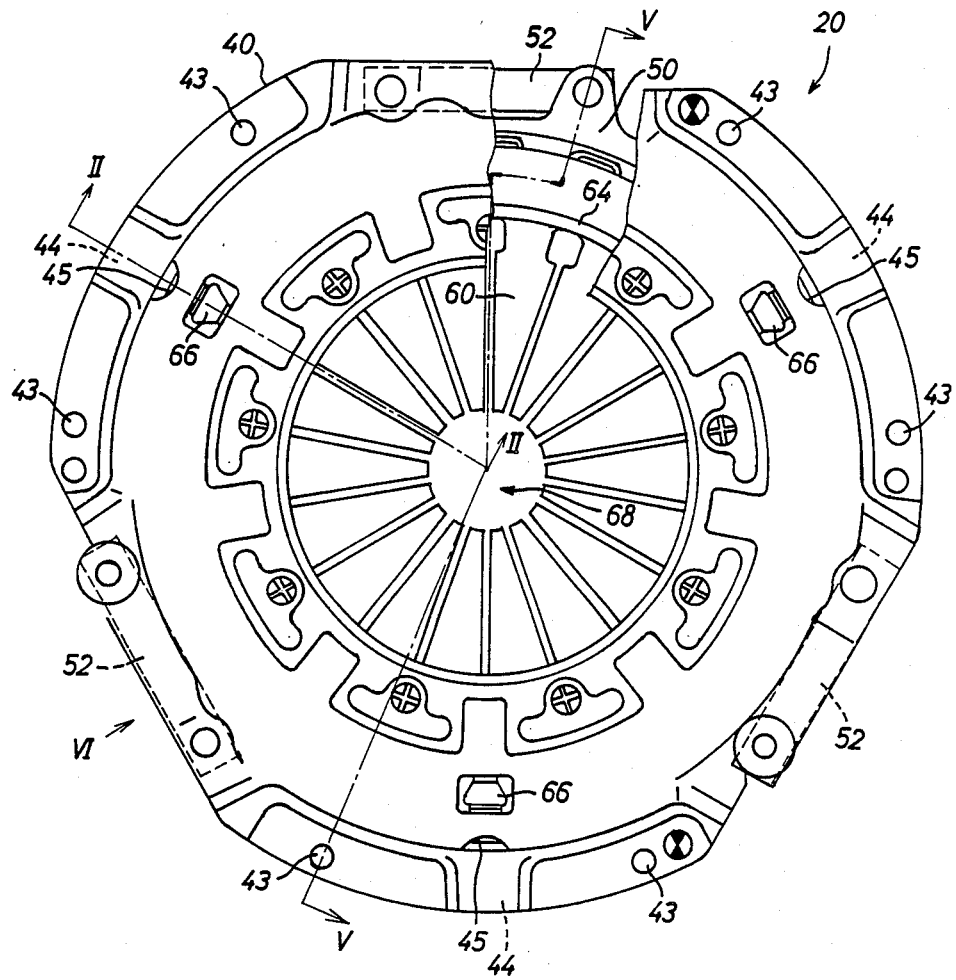
FIG. 4 is a partly broken front view of the friction disc clutch assembly shown in FIG. 3.
Figure 6:
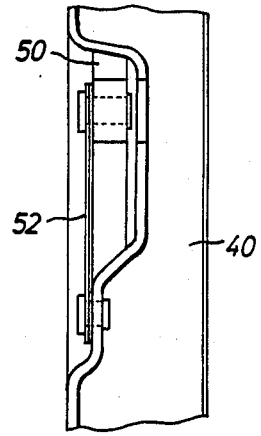
FIG. 6 is a side view looking in the direction shown by an arrow VI in FIG. 4.

The pressure plate 50 is formed at one side thereof with an annular friction surface 54 opposed to the annular friction surface 14 of flywheel 12. As shown in FIG. 6, a cordal strap 52 is riveted at its one end to the pressure plate 50 and at its other end to the clutch cover 40 to support the pressure plate 50 for rotation with the clutch cover 40 and support it axially displaceably with respect to the flywheel 12. As shown in FIG. 4, the cordal strap 52 is arranged at the circumferentially equi-spaced three positions of clutch cover 40 to bias the pressure plate 50 in a direction apart from the flywheel 12, and the clutch cover 40 is secured to the flywheel 12 by bolts 30 at a place between the cordal straps 52.

Figure 2:
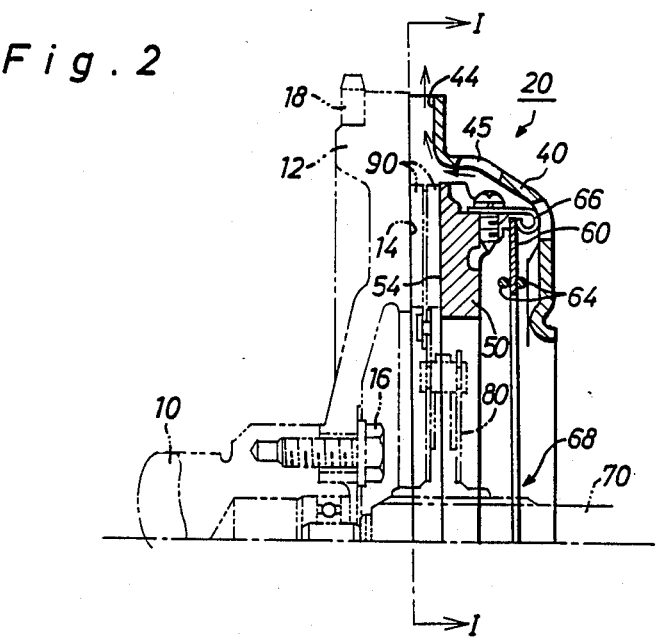
FIG. 2 is a cross-sectional view taken along line II—II in FIG. 4, showing components of a friction disc clutch assembly in accordance with the present invention.
Figure 3:
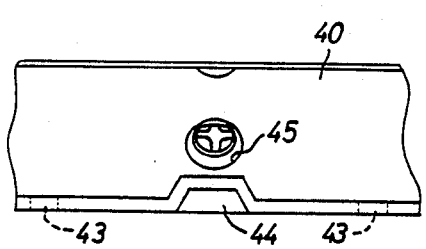
FIG. 3 is a side view looking in the direction shown by an arrow III in FIG. 1.
Figure 5:
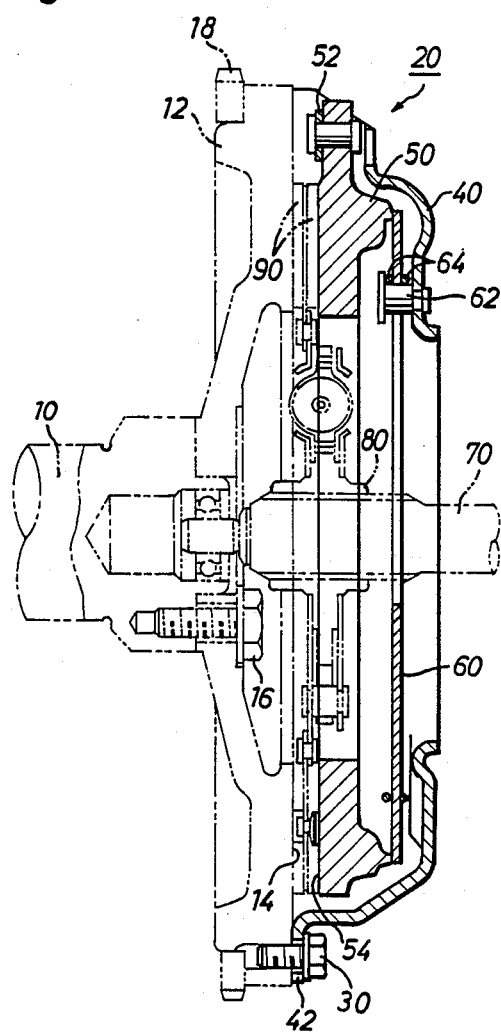
FIG. 5 is a cross-sectional view taken along line V—V in FIG 4.

As shown in FIGS. 4 and 5, the diaphragm spring 60 is pivotally supported by a pair of pivot rings 64 which are supported by a plurality of circumferentially equi-spaced support rivets 62 fixed to the inner peripheral portion of clutch cover 40. The diaphragm spring 60 is engaged at the outer peripheral portion thereof with the pressure plate 50 to bias the pressure plate 50 toward the flywheel 12. As shown in FIGS. 2 and 4, the diaphragm spring 60 is further engaged at the outer peripheral portion thereof with circumferentially equi-spaced three retract springs 66 which are bolted to the outer periphery of pressure plate 50 to cause outward displacement of the pressure plate 50 apart from the flywheel 12 in response to release of the clutch assembly 20. The clutch disc 80 is integrally provided with a pair of clutch facings 90 to be brought into engagement with the friction surface 14 of flywheel 12 and the friction surface 54 of pressure plate 50 for transmitting rotational torque from the drive shaft 10 to the driven shaft 70.

Figure 9:
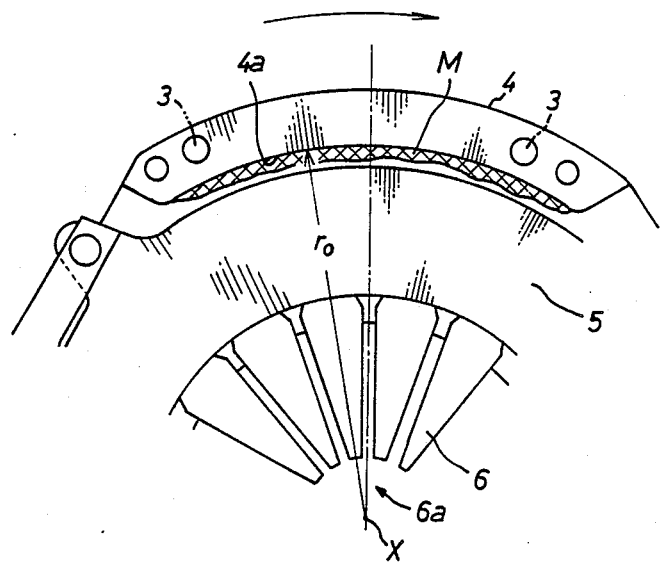
FIG. 9 is a fragmentary front view showing an outer peripheral portion of a clutch cover in a conventional friction disc clutch assembly.
Figure 10:
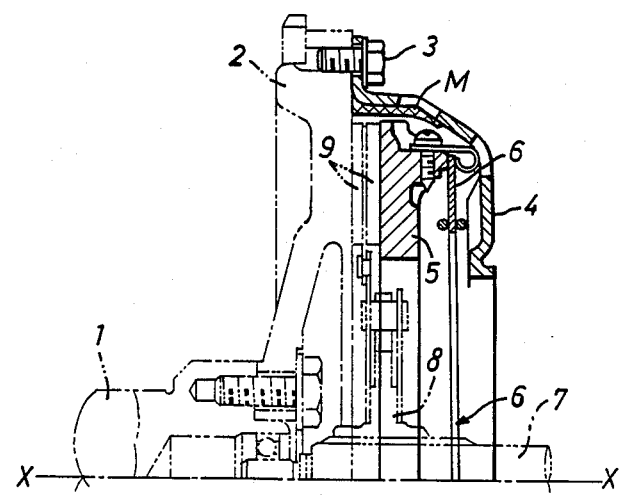
FIG. 10 is a cross-sectional view showing components of the conventional friction disc clutch assembly.

As shown in FIGS. 1 through 4, the clutch cover 40 is formed at its outer peripheral rim 42 with circumferentially equi-spaced radial recesses 44 which are located substantially at the center between each pair of circumferentially spaced bolts 30 and extend outwardly from an internal cylindrical surface 46 of clutch cover 40. As shown in FIG. 2, each of radial recesses 44 is opposed to the annular friction surface 14 of flywheel 12 to form a radial exhaust hole. The internal cylindrical surface 46 of clutch cover 40 includes a pair of guide surfaces 46a and 46b which are inclined radially outwardly toward the radial recess 44. The inclined guide surfaces 46a and 46b each are formed as an arc-shaped surface the radius $r_1$ of which is determined with center at a point $O_1$ radially outwardly spaced from the rotation center X of the clutch assembly 20. In addition, the radius $r_1$ is determined smaller than the conventional radius $r_o$ shown in FIG. 9. The outer peripheral rim 42 of clutch cover 40 is formed with a plurality of circumferentially spaced holes 43 through which the bolts 30 are threaded into the flywheel 12.

Assuming that an automotive vehicle equipped with the friction disc clutch assembly 20 is traveling on a muddy road, an amount of muddy water flows into the interior of clutch cover 40 through a central opening 68 of diaphragm spring 60 and is splashed radially outwardly due to a centrifugal force acting thereon. In this instance, the muddy water is splashed onto the internal cylindrical surface 46 of clutch cover 40 and guided by the inclined guide surfaces 46a, 46b to flow into the respective radial recesses 44, as shown by arrows in FIGS. 1 and 2. Thus, the muddy water is smoothly exhausted from the interior of clutch cover 40. This is effective to eliminate drawbacks caused by deposit of the muddy water in the interior of clutch cover 40. Additionally, the air in clutch cover 40 is smoothly guided by the inclined guide surfaces 46a, 46b to flow into the respective radial recesses 44. This is effective to enhance cooling ability of the clutch assembly.

Figure 7:
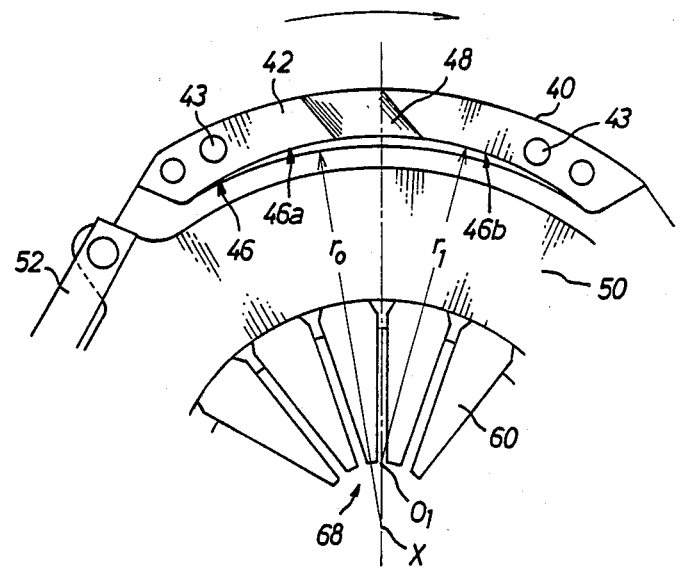
FIG. 7 is a fragmentary front view illustrating a modification of the clutch cover shown in FIG. 1.
Figure 8:
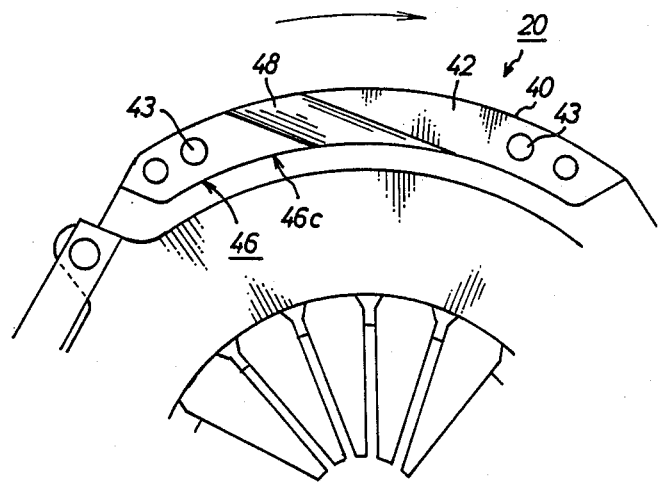
FIG. 8 is a fragmentary front view illustrating another modification of the clutch cover shown in FIG. 1.

In FIG. 7 there is illustrated a modification of the clutch assembly 20, wherein the radial recess 44 of clutch cover 40 is replaced with a radial recess 48 which is inclined in a direction opposite to the rotational direction of the clutch assembly 20 to enhance exhaust effect of the muddy water from the interior of clutch cover 40. In FIG. 8 there is illustrated another modification of the clutch assembly 20, wherein the radial recess 44 of clutch cover 40 is replaced with a radial recess 48 which opens outwardly at a position spaced from the center between bolts 30 and is inclined in a direction opposite to the rotational direction of the clutch assembly 20 and wherein the internal cylindrical surface 46 of clutch cover 40 is formed as an inclined flat surface extending into the inclined radial recess 48. In the case that the clutch cover 40 is made of aluminum alloy casting, the radial recess 44 may be replaced with a radial hole drilled in the outer peripheral rim of the clutch cover.

Although the present invention has been illustrated and described in connection with a specific embodiment and certain modifications thereof, various other modifications and adaptations are possible in the light of the above teachings. It is therefore to be understood that within the scope of the appended claims, the invention may be practiced otherwise than as specifically described herein.

What is claimed is:

1. A friction disc clutch assembly for automotive vehicles of the type which includes drive and driven shafts arranged coaxially to each other, a flywheel secured to said drive shaft, a clutch cover having an outer peripheral rim secured to said flywheel by means of a plurality of circumferentially spaced bolts and being formed with an internal cylindrical surface located between each pair of circumferentially spaced bolts, a pressure plate mounted within said clutch cover in such a manner as to be rotatable with and axially displaceable with respect to said flywheel, resilient means assembled within said clutch cover to bias said pressure plate toward side flywheel, and a clutch disc axially slidably mounted on said driven shaft and interposed between said flywheel and said pressure plate to transmit rotational torque from said drive shaft to said driven shaft when pressed therebetween said flywheel and said pressure plate under the biasing force of said resilient means, wherein the outer peripheral rim of said clutch cover is formed with a radial exhaust hole located between each pair of said circumferentially spaced bolts and extending outwardly from the internal cylindrical surfaces of said clutch cover, and wherein the internal cylindrical surface of said clutch cover includes a pair of guide surfaces inclined radially outwardly toward said radial exhaust hole along circumferential portions of said cylindrical surface adjacent said radial exhaust hole, each guide surface comprising an arc-shaped surface with an arc center radially outwardly spaced from the rotation center of the clutch assembly.

2. A friction disc clutch assembly as recited in claim 1, wherein said radial exhaust hole is formed by a radial recess formed on the outer peripheral rim of said clutch cover and opposed to an annular friction surface of said flywheel.

3. A friction disc clutch assembly as recited in claim 1, wherein said radial exhaust hole is located substantially at the center between each pair of said circumferentially spaced bolts.

4. A friction disc clutch assembly as recited in claim 1, wherein said radial exhaust hole is formed by a radial recess formed on the outer peripheral rim of said clutch cover and opposed to an annular friction surface of said flywheel, said radial recess being inclined in a direction opposite to the rotational direction of said drive shaft.

* * * * *